US006868151B1

United States Patent
Brunner et al.

(10) Patent No.: US 6,868,151 B1
(45) Date of Patent: Mar. 15, 2005

(54) METHOD AND DEVICE FOR INCREASING THE FAIL SAFETY OF INFORMATION DESKS CONNECTED TO EXCHANGES

(75) Inventors: Roland Brunner, Vienna (AT); Gerhard Roscher, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 181 days.

(21) Appl. No.: 10/049,183

(22) PCT Filed: Aug. 8, 2000

(86) PCT No.: PCT/DE00/02643

§ 371 (c)(1),
(2), (4) Date: Jun. 17, 2002

(87) PCT Pub. No.: WO01/11855

PCT Pub. Date: Feb. 15, 2001

(30) Foreign Application Priority Data

Aug. 10, 1999 (DE) .......................... 199 37 675

(51) Int. Cl.$^7$ ................................ H04M 7/06
(52) U.S. Cl. .............. 379/219; 379/221.03; 379/221.04
(58) Field of Search ........................... 379/219, 220.01, 379/221.01, 221.03, 221.04, 229, 230, 201.01, 265.01–265.14, 309

(56) References Cited

U.S. PATENT DOCUMENTS

| 5,848,143 A | 12/1998 | Andrews et al. |
| 5,910,982 A | 6/1999 | Shaffer et al. |

FOREIGN PATENT DOCUMENTS

| EP | 0 802 665 A2 | 10/1997 |
| EP | 0 903 921 A2 | 3/1999 |
| WO | WO 98/25387 | 6/1998 |
| WO | WO 98/25418 | 6/1998 |
| WO | WO 99/17517 | 4/1999 |

Primary Examiner—William J. Deane, Jr.
(74) Attorney, Agent, or Firm—Morrison & Foerster LLP

(57) ABSTRACT

The invention specifies an information center (CC) in a telecommunication network and a method for operating said information center, where the information center (CC) is connected to an exchange (VST) and comprises both a mainframe (CTI), connected to the exchange (VST), and at least one information desk (AP) having at least one telecommunication terminal. The basic functions for operating the information center (CC) can be performed by a plurality of elements of the information center (CC), so that the failure of individual elements cannot result in the failure of the entire information center (CC). These include, firstly, call distribution, which can be performed both by the mainframe (CTI) and by the exchange (VST) itself, and secondly duplication of the telecommunication terminals, including the necessary data transfer paths.

8 Claims, 1 Drawing Sheet

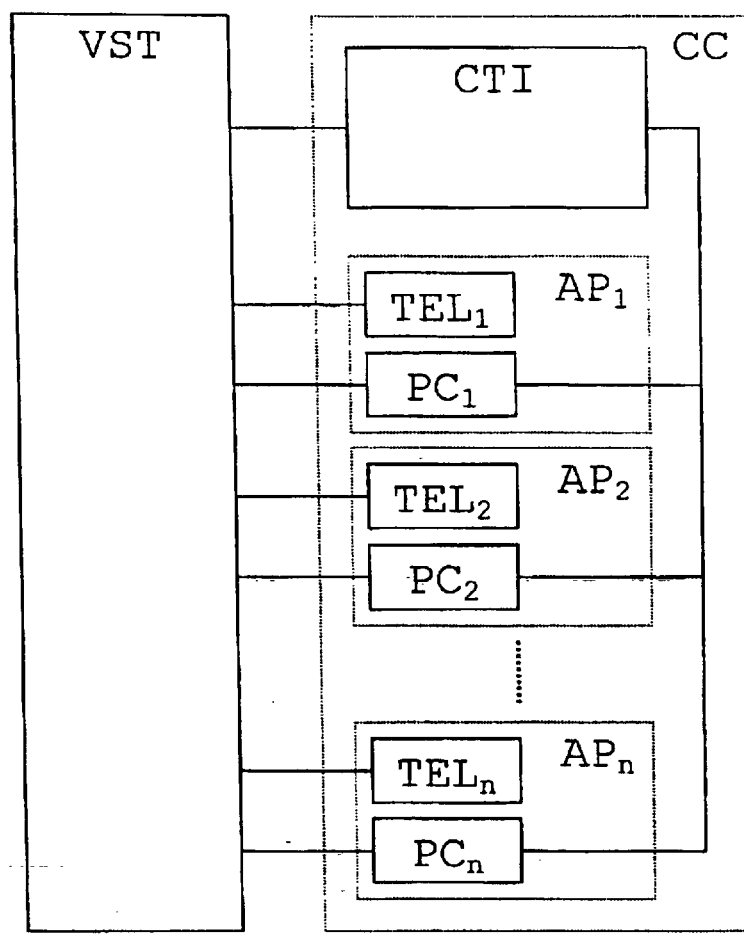

METHOD AND DEVICE FOR INCREASING THE FAIL SAFETY OF INFORMATION DESKS CONNECTED TO EXCHANGES

TECHNICAL FIELD

The invention relates to an information center in a telecommunication network, which information center is connected to an exchange and comprises both a mainframe, connected to the exchange, and at least one information desk having at least one telecommunication terminal. The invention also relates to a method for operating an information center of the type mentioned.

PRIOR ART

The information centers addressed essentially have the task of providing call number information and, if necessary, setting up the connection to the subscriber required by the caller. In addition, these centers normally provide a multiplicity of additional services, including, by way of example, the connection of telephone conference calls, simultaneous translation or monitoring of the length of a call. The functionality of such an information center is also described by the term "Call Center".

The use of a mainframe pursues the objective, firstly, of collecting the status reports from the connected information desks, such as "free" or "busy", storing them centrally and, on the basis of this information, connecting an incoming call to an information desk using the exchange, and secondly of providing those processes and data which need to be available centrally in order to be able to satisfy the demands placed on such an information center, and also of permitting connection to external data networks. A mainframe having the aforementioned properties is also known by term "Computer Telephone Integration Server", or "CTI Server" for short.

The high number of callers to be controlled, and the need for an information center for the telephone traffic, means that failure of such an information center is a serious technical problem.

In conventional information centers, such total failure occurs simply if one of the elements contained fails, be it the mainframe, the data line between the exchange and the mainframe, the data lines between the mainframe and the individual information desks or the personal computers on the information desks. Failure of an element can be caused by the failure of the relevant power supply network, for example.

The invention is therefore based on the object of specifying an information center in a telecommunication network, which information center is connected to an exchange and comprises both a mainframe, connected to the exchange, and at least one information desk having at least one telecommunication terminal, without the cited drawbacks arising.

DESCRIPTION OF THE INVENTION

The invention achieves this object with an information center of the type mentioned in the introduction, in which
- the information desk is connected to the exchange and to the mainframe via data transfer devices,
- the basic function of distributing the incoming calls and setting up a voice link to a telecommunication terminal on the information desk is incorporated in the exchange,
- the exchange continuously checks the ready status of the mainframe and of the telecommunication terminals, including the communication links thereto, and detects any fault arising,
- the mainframe continuously checks the ready status of the telecommunication terminals, including the data transfer path thereto, detects any fault arising and reports this to the exchange, and
- if the information desks cannot be reached via the mainframe, the exchange at least performs call distribution and sets up a voice link to a telecommunication terminal on the information desk.

In one advantageous refinement of the invention, the telecommunication terminal provided on the information desk is a personal computer equipped with means for voice input and voice output, and also with means for connection to the telecommunication network and means for data transfer to the mainframe. The means provided for voice input may be, by way of example, a microphone, and the means provided for voice output may be headphones. For connection to the telecommunication network and to the data network, plug-in cards are used, for example, which essentially permit the data to be converted into a serial data format in line with the respective transfer protocol. The simultaneous connection to a telecommunication network and a computer data network makes it possible to meet the demands placed on the telecommunication terminal in a particularly user-friendly manner. In addition, if the data transfer path to the mainframe fails, restricted operation can be maintained. In this context, the functionality during restricted operation depends essentially on which data and processes are incorporated locally in the personal computer on the information desk. In the course of the disclosure, it may be pointed out that the increasing integration of voice data into the computer data networks means that there is no absolute need for there to be a difference the data protocols of the telecommunication network and of the data network for the mainframe. This merging is also known by the term "Voice over Internet Protocol".

It is particularly advantageous if the information desk comprises both a telephone and a personal computer having the aforementioned properties. In addition to the advantages already cited, the full functionality of the information desk is maintained even if one of the two telecommunication terminals cannot be reached. Besides this, emergency operation can be maintained even in the event of total failure of the personal computer, for example on account of a power failure, since the telephone is supplied with the required power by the exchange.

It is beneficial if the telecommunication terminals on the information desk are connected to the exchange by means of ISDN basic accesses, since a signaling channel and associated services useful for an information center are stipulated in the appropriate data transfer protocol.

In one particularly advantageous refinement of the invention, during fault-free operation, the overall central functionality is ensured by the mainframe, and only status reports from the connected units are processed within the exchange. The separate arrangement of the mainframe means that new services can be introduced more easily, and the unit remains relatively easy to maintain. Besides this, the exchange is not additionally loaded with the central data and processes required for the full functionality of an information center, but rather provides only indispensable resources.

It is also advantageous if the restricted operation of the information center is maintained by the exchange on its own until the mainframe is ready to resume normal operation.

Changeover from normal operation to restricted operation and vice versa is thus performed fully automatically by the program running in the exchange, and takes place without further action by the staff responsible for the exchange.

In one particularly advantageous refinement of the invention, if a telecommunication terminal on the information desk cannot be reached, at least call distribution and the setup of a voice link to another, ready telecommunication terminal on the information desk are performed. Duplication of the telecommunication terminals and of the transfer paths to the exchange significantly increases the resistance to failure of the information center.

DESCRIPTION OF THE DRAWINGS

The invention is explained in more detail with reference to the FIGURE, which shows the illustrative arrangement of the elements of an information center.

BEST WAY OF IMPLEMENTING THE INVENTION

The information center CC shown in the FIGURE comprises a mainframe CTI and a plurality of information desks AP1 to APn which are of identical design and each comprise a telephone TEL and a personal computer PC. In the exemplary embodiment, both the telephones TEL1 to TELn and the personal computers PC1 to PCn are connected to the exchange VST via ISDN basic accesses, but analog connecting lines are also conceivable. The personal computers PC1 to PCn are additionally connected to the mainframe CTI via data lines combined in a bus structure. The mainframe CTI is likewise connected to the exchange VST via a data line.

The illustrative information center works in the manner below, where firstly normal operation but also restricted modes of operation caused by failure of at least one element of the information center are explained:

During normal operation, an incoming call is reported by a program running in the exchange VST, the "call distribution program", to the program running on the mainframe CTI, the central program. Using the information available on the mainframe CTI, which information also includes the states "free" and "busy" for the information desks AP1 to APn, the central program determines to which information desk AP1 to APn the call will be forwarded. In addition, the mainframe CTI is also used to provide the data and processes needed for full operation of the information center CC, and also the connection to external service providers. The staff at the relevant information desk AP can now use the personal computer PC to provide the service they require. The status reports from the information desks AP1 to APn are continuously recorded both by the central program and by the call distribution program. Apart from collection and storage of these status reports, the call distribution program has no other tasks during normal operation.

If the mainframe CTI or a line connected thereto fails, this is detected by means of the call distribution program. The latter then performs the function of call distribution required for an information center CC whatever happens, and connects incoming calls to the telephone TEL or to the personal computer PC on the respective information desk AP. When normal operation can be resumed following repair of the damage, an appropriate report is sent by the central program to the call distribution program. The latter then limits its functionality to the extent provided during normal operation.

If a telephone TEL, or its line connected to the exchange VST, on an information desk AP fails, the full functionality of the information center CC is maintained. The same applies for failure of a personal computer PC or of a data line connected thereto, with services which typically require the use of a computer not being able to be provided, or being able to be provided only to a restricted degree.

What is claimed is:

1. An information center (CC) in a telecommunication network, which information center is connected to an exchange (VST) and comprises both a mainframe (CTI), connected to the exchange (VST), and at least one information desk (AP) having at least one telecommunication terminal, characterized in that the information desk (AP) is connected to the exchange (VST) and to the mainframe (CTI) via data transfer devices, and in that the basic function of distributing the incoming calls and setting up a voice link to a telecommunication terminal on the information desk (AP) is incorporated in the exchange (VST).

2. The information center (CC) as claimed in claim 1, characterized in that the telecommunication terminal provided on the information desk (AP) is a personal computer (PC) which comprises means for voice input and voice output, means for connection to the telecommunication network and means for data transfer to the mainframe (CTI).

3. The information center (CC) as claimed in claim 1, characterized in that the telecommunication terminals provided on the information desk (AP) are a telephone (TEL) and a personal computer (PC), and in that the personal computer (PC) comprises means for voice input and voice output, means for connection to the telecommunication network and means for data transfer to the mainframe (CTI).

4. The information center (CC) as claimed in claim 1, characterized in that the at least one telecommunication terminal on the information desk (AP) is connected to the exchange (VST) via at least one ISDN basic access.

5. A method for operating an information center (CC) as claimed in one of claims 1 to 4, characterized in that the exchange (VST) continuously checks the ready status of the mainframe (CTI) and of the telecommunication terminals, including the communication links thereto, and detects any fault arising, in that the mainframe (CTI) continuously checks the ready status of the telecommunication terminals, including the data transfer path thereto, detects any fault arising and reports this to the exchange (VST), in that, if the information desks (AP) cannot be reached via the mainframe (CTI), the exchange (VST) at least performs call distribution and sets up a voice link to a telecommunication terminal on the information desk (AP).

6. The method as claimed in claim 5, characterized in that, during fault-free operation, the processes needing to take place centrally for the information center (CC) to be fully functional run on the mainframe (CTI), and at least status reports from the units connected to the exchange (VST) are processed within the latter.

7. The method as claimed in claim 5, characterized in that the restricted operation of the information center (CC) is maintained by the exchange (VST) on its own until the mainframe (CTI) is ready to resume normal operation.

8. The method as claimed in claim 5, characterized in that, if a telecommunication terminal on the information desk (AP) cannot be reached, at least call distribution and the setup of a voice link to another, ready telecommunication terminal on the information desk (AP) are performed.

* * * * *